United States Patent
McGiffen et al.

(10) Patent No.: US 12,483,322 B2
(45) Date of Patent: Nov. 25, 2025

(54) METHODS AND APPARATUSES FOR ESTIMATING PROPAGATION DELAY BETWEEN A NON-TERRESTRIAL NODE AND A TERRESTRIAL NODE WITHOUT GNSS

(71) Applicant: SHARP KABUSHIKI KAISHA, Sakai (JP)

(72) Inventors: Thomas Glenn McGiffen, Vancouver, WA (US); John Michael Kowalski, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 338 days.

(21) Appl. No.: 18/269,591

(22) PCT Filed: Dec. 24, 2021

(86) PCT No.: PCT/JP2021/048418
§ 371 (c)(1),
(2) Date: Jun. 26, 2023

(87) PCT Pub. No.: WO2022/145398
PCT Pub. Date: Jul. 7, 2022

(65) Prior Publication Data
US 2024/0097777 A1 Mar. 21, 2024

Related U.S. Application Data

(60) Provisional application No. 63/131,275, filed on Dec. 28, 2020.

(51) Int. Cl.
*H04B 7/185* (2006.01)
*H04W 56/00* (2009.01)

(52) U.S. Cl.
CPC .... H04B 7/18513 (2013.01); H04W 56/0045 (2013.01)

(58) Field of Classification Search
CPC ........... H04B 7/18513; H04B 7/18504; H04W 56/0045; H04W 24/08; H04W 56/005; H04W 56/0065; H04W 84/06
See application file for complete search history.

(56) References Cited

U.S. PATENT DOCUMENTS

| | | | |
|---|---|---|---|
| 2021/0029658 A1* | 1/2021 | Mahalingam | H04W 56/0005 |
| 2023/0137050 A1* | 5/2023 | Park | H04W 56/0015 370/503 |
| 2024/0348328 A1* | 10/2024 | Khan | H04W 56/0045 |

OTHER PUBLICATIONS

Saleh, Sharief, et al. "Integrated 6g tn and ntn localization: Challenges, opportunities, and advancements." IEEE Communications Standards Magazine (2025). (Year: 2025).*

(Continued)

*Primary Examiner* — Sharad Rampuria
(74) *Attorney, Agent, or Firm* — ScienBiziP, P.C.

(57) ABSTRACT

A user equipment (UE) includes one or more non-transitory computer-readable media having computer-executable instructions embodied thereon, and at least one processor coupled to the one or more non-transitory computer-readable media, and configured to execute the computer-executable instructions to: estimate a first Doppler frequency shift in a signal received from a non-terrestrial network (NTN) node at a first time instance, estimate a second Doppler frequency shift in the signal at a second time instance, estimate a signal propagation delay between the NTN node and the UE based on the first Doppler frequency shift and the second Doppler frequency shift, and apply the signal propagation delay to compensate for an uplink transmission from the UE to the NTN node.

13 Claims, 5 Drawing Sheets

(56) References Cited

OTHER PUBLICATIONS

3GPP TS 38.331 V16.2.0 (Sep. 2020) 3rd Generation Partnership Project; Technical Specification Group Radio Access Network; NR; Radio Resource Control (RRC) protocol specification (Release 16).
3GPP TR 38.822 V15.0.1 (Jul. 2019) 3rd Generation Partnership Project; Technical Specification Group Radio Access Network; NR; User Equipment (UE) feature list (Release 15).
Lenovo et al., "Enhancement to Support NBIoT and eMTC on NTN", R1-2008921, 3GPP TSG RAN WG1 Meeting #103e, e-Meeting, Oct. 19-Nov. 6, 2020.
Ericsson, "On UL time and frequency synchronization enhancements for NTN", R1-2009092, 3GPP TSG-RAN WG1 Meeting #103-e, e-Meeting, Oct. 26-Nov. 13, 2020.

\* cited by examiner

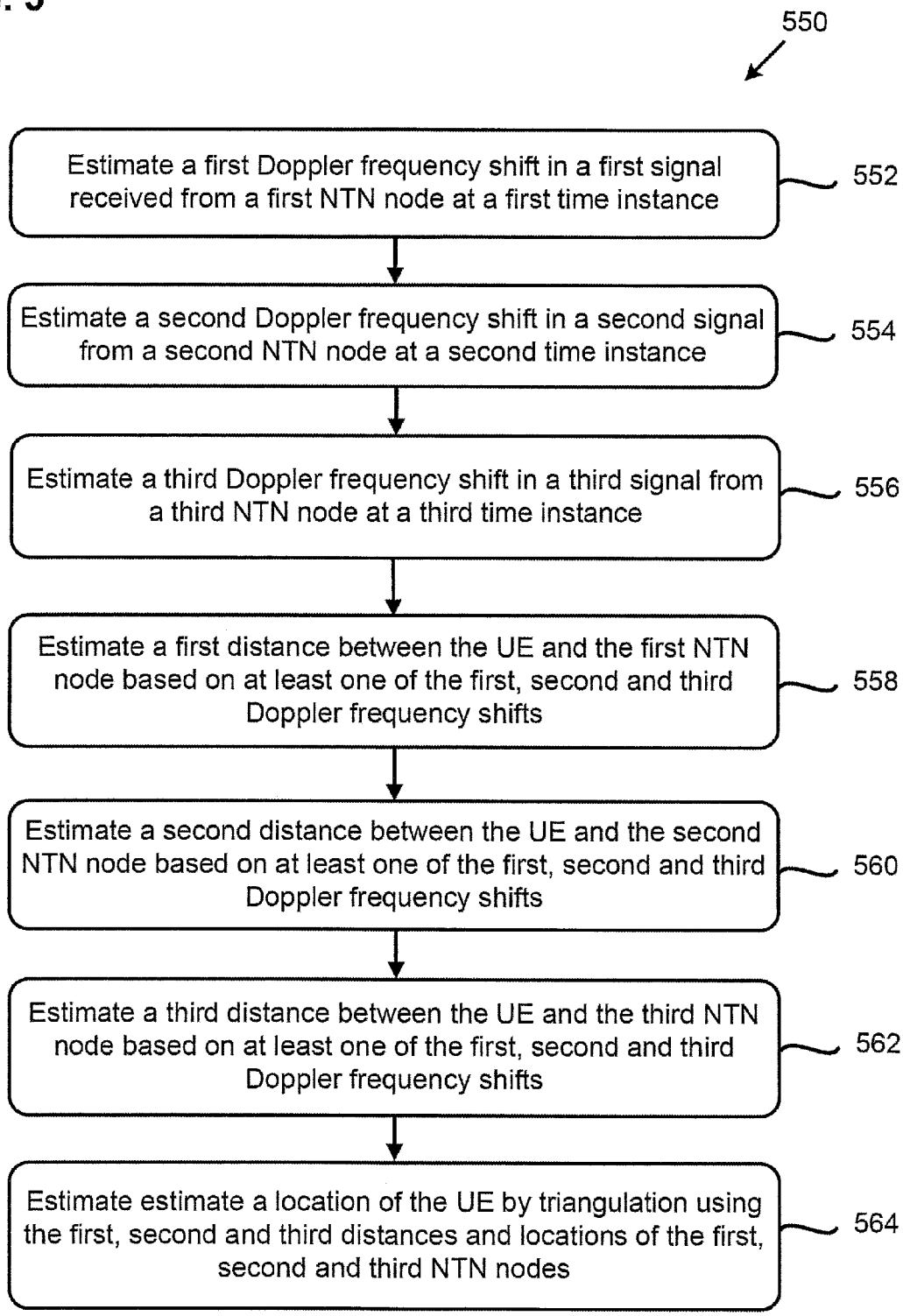

METHODS AND APPARATUSES FOR ESTIMATING PROPAGATION DELAY BETWEEN A NON-TERRESTRIAL NODE AND A TERRESTRIAL NODE WITHOUT GNSS

CROSS REFERENCE

This Nonprovisional application claims priority under 35 U.S.C. § 119 on provisional Application No. 63/131,275 on Dec. 28, 2020, the entire contents of which are hereby incorporated by reference.

TECHNICAL FIELD

The present disclosure is generally related to wireless communications, more specifically, related to estimating the propagation delay between a non-terrestrial node and a terrestrial node without GNSS

BACKGROUND ART

Recently, non-terrestrial networks (NTNs) having one or more satellites and/or High-Altitude Platform Services (HAPSs) have received much attention for their integration with cellular systems for communication with user equipment (UE) on the ground in the next generation communications systems (e.g., the $5^{th}$ Generation (5G) New Radio (NR) systems). However, the signal propagation delay between a serving HAPS or satellite and individual UE is unique as a result of the integration and has not been adequately addressed. Knowledge of signal propagation delay is necessary so that subsequently transmitted signals are appropriately timed for proper reception.

One proposed solution involves transmitting the HAPS/serving satellite location to the UE, having the UE compute its own location via a Global Navigation Satellite System (GNSS), and determining the propagation delay using the location of the UE. This approach requires the UE to be GNSS equipped and working properly with GNSS serving satellite(s). However, when a UE does not have GNSS capabilities or when a GNSS-equipped UE cannot use GNSS, for example, because of poor link conditions to the GNSS serving satellite(s), the accuracy of the UE's location, and therefore delay estimation based on GNSS, may be degraded.

Another proposed solution involves a laborious redesign of the cellular system to allow for a UE to transmit without knowing and subsequently compensating for this unique HAPS/satellite to UE delay. Received data usually has a well-known receive time. If the delay is unknown, this receive time varies greatly, thus greatly degrading system performance. A redesign to accommodate an unknown delay is being investigated. It is unknown if a redesign will be successful.

Thus, there is a need in the art for a reliable and efficient way of estimating the signal propagation delay between an NTN node and a UE for cellular systems so that wireless communications (e.g., uplink and/or downlink signals) can be appropriately timed for proper reception.

SUMMARY OF INVENTION

In one example, a user equipment (UE), comprising: one or more non-transitory computer-readable media having computer-executable instructions embodied thereon; and at least one processor coupled to the one or more non-transitory computer-readable media, and configured to execute the computer-executable instructions to: estimate a first Doppler frequency shift in a signal received from a non-terrestrial network (NTN) node at a first time instance; estimate a second Doppler frequency shift in the signal at a second time instance; estimate a signal propagation delay between the NTN node and the UE based on the first Doppler frequency shift and the second Doppler frequency shift; and apply the signal propagation delay to compensate for an uplink transmission from the UE to the NTN node.

In one example, a method by a user equipment (UE) for estimating a signal propagation delay between a non-terrestrial network (NTN) node and the UE, the method comprising: estimating a first Doppler frequency shift in a signal received from the NTN node at a first time instance; estimating a second Doppler frequency shift in the signal at a second time instance; estimating the signal propagation delay between the NTN node and the UE based on the first Doppler frequency shift and the second Doppler frequency shift; and applying the signal propagation delay to compensate for an uplink transmission from the UE to the NTN node.

In one example, a non-terrestrial network (NTN) node, comprising: one or more non-transitory computer-readable media having computer-executable instructions embodied thereon; and at least one processor coupled to the one or more non-transitory computer-readable media, and configured to execute the computer-executable instructions to: estimate a first Doppler frequency shift in a signal received from a user equipment (UE) at a first time instance; estimate a second Doppler frequency shift in the signal at a second time instance; estimate a signal propagation delay between the UE and the NTN node based on the first Doppler frequency shift and the second Doppler frequency shift; and apply the signal propagation delay to compensate for a downlink transmission from the NTN node to the UE.

BRIEF DESCRIPTION OF DRAWINGS

Implementations of the present technology will now be described, by way of example only, with reference to the attached figures.

FIG. 5 illustrates a flowchart of a method performed by a UE for estimating the UE's location based on Doppler frequency shift, in accordance with an implementation of the present disclosure.

DESCRIPTION OF EMBODIMENTS

Figure 1:
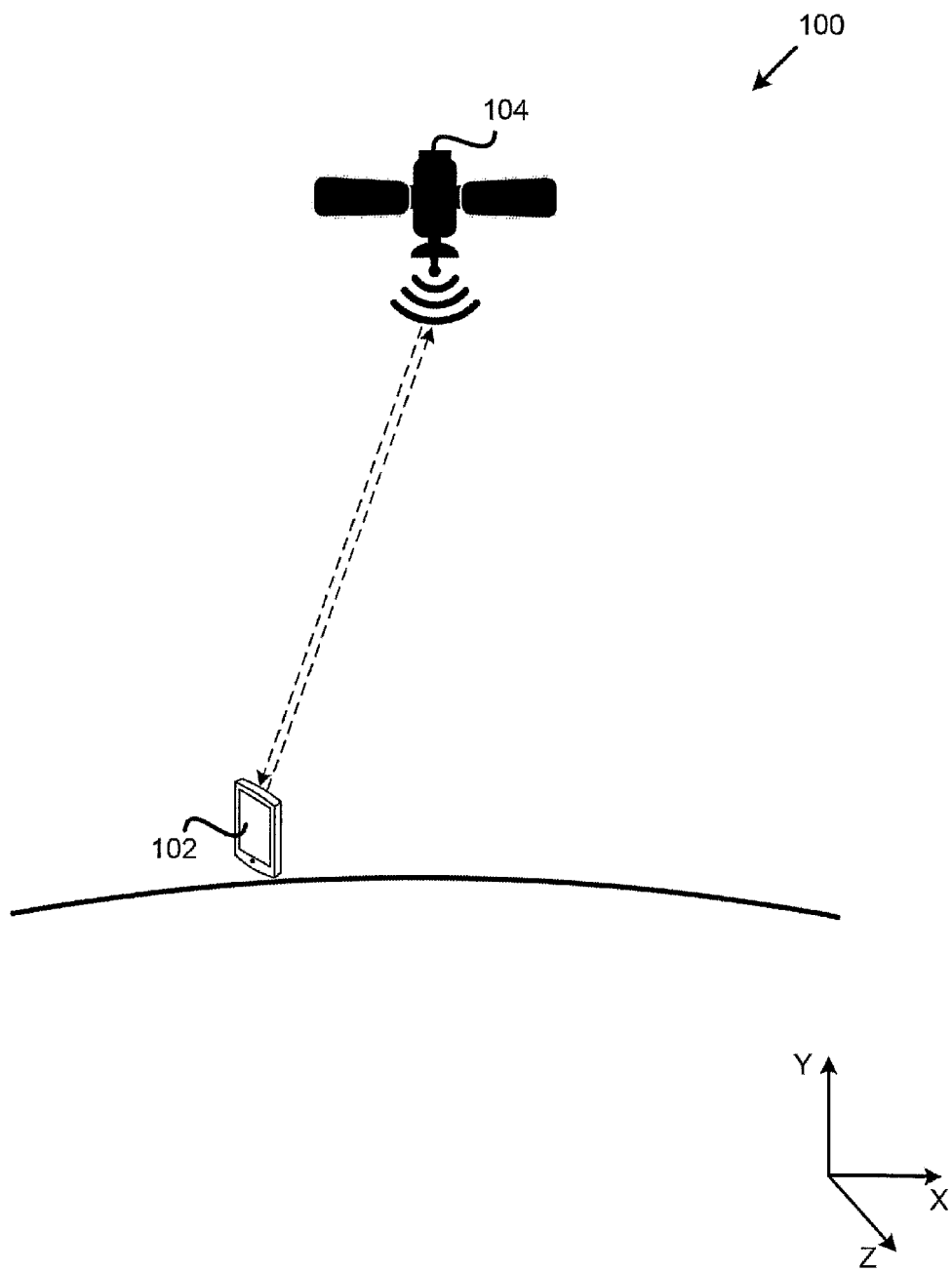
FIG. 1 illustrates an NTN having at least one UE and an NTN node, in accordance with an implementation of the present disclosure.

The present disclosure relates to methods and apparatuses for estimating the propagation delay between a non-terrestrial node and a terrestrial node without GNSS.

According to a first aspect of the present disclosure, a user equipment (UE) comprises one or more non-transitory computer-readable media having computer-executable instructions embodied thereon; and at least one processor coupled to the one or more non-transitory computer-readable media, and configured to execute the computer-executable instructions to: estimate a first Doppler frequency shift in a signal received from a non-terrestrial network (NTN) node at a first time instance; estimate a second Doppler frequency shift in the signal at a second time instance; estimate a signal propagation delay between the NTN node and the UE based on the first Doppler frequency shift and the second Doppler frequency shift; and apply the signal propagation delay to compensate for an uplink transmission from the UE to the NTN node.

In one implementation of the first aspect, the first Doppler frequency shift is between a downlink carrier frequency of the signal transmitted by the NTN node and a measured or estimated downlink carrier frequency of the signal received at the UE at the first time instance.

In another implementation of the first aspect, the second Doppler frequency shift is between a downlink carrier frequency of the signal transmitted by the NTN node and a measured or estimated downlink carrier frequency of the signal received at the UE at the second time instance.

In yet another implementation of the first aspect, the at least one processor is further configured to execute the computer-executable instructions to estimate a first distance between the NTN node and the UE at the first time instance based on at least one of the first Doppler frequency shift and the second Doppler frequency shift.

In yet another implementation of the first aspect, the signal propagation delay between the NTN node and the UE is estimated to be the first distance divided by the speed of light.

In yet another implementation of the first aspect, the at least one processor is further configured to execute the computer-executable instructions to estimate a second distance between the NTN node and the UE at the second time instance based on at least one of the first Doppler frequency shift and the second Doppler frequency shift.

In yet another implementation of the first aspect, the signal propagation delay between the NTN node and the UE is estimated to be the second distance divided by the speed of light.

In yet another implementation of the first aspect, the NTN node is in a low earth orbit (LEO) or a middle earth orbit (MEO).

In yet another implementation of the first aspect, the NTN node is in a geostationary orbit.

In yet another implementation of the first aspect, the UE is configured to communicate with the NTN node using a 5th Generation (5G) New Radio (NR) radio access technology (RAT).

In yet another implementation of the first aspect, applying the signal propagation delay to compensate for the uplink transmission from the UE to the NTN node includes advancing a timing of the uplink transmission to the NTN node by the signal propagation delay.

In yet another implementation of the first aspect, the NTN node is a satellite or a High-Altitude Platform Service (HAPS).

In yet another implementation of the first aspect, the UE is stationary between the first time instance and the second time instance.

In yet another implementation of the first aspect, the UE moves from a first location at the first time instance to a second location at the second time instance.

In yet another implementation of the first aspect, the UE is one without Global Navigation Satellite System (GNSS) capabilities or with GNSS capabilities but suffering from a GNSS outage.

In yet another implementation of the first aspect, the at least one processor is further configured to execute the computer-executable instructions to transmit the UE's non-GNSS Doppler tracking capability information to a ground-based base station communicatively coupled to the NTN node.

In yet another implementation of the first aspect, the at least one processor is further configured to execute the computer-executable instructions to transmit an indication of the UE's GNSS outage (GNSSOutageUE) to a ground-based base station communicatively coupled to the NTN node.

According to a second aspect of the present disclosure, a method performed by a user equipment (UE) comprises: estimating a first Doppler frequency shift in a signal received from the NTN node at a first time instance; estimating a second Doppler frequency shift in the signal at a second time instance; estimating the signal propagation delay between the NTN node and the UE based on the first Doppler frequency shift and the second Doppler frequency shift; and applying the signal propagation delay to compensate for an uplink transmission from the UE to the NTN node.

In one implementation of the second aspect, the first Doppler frequency shift is between a downlink carrier frequency of the signal transmitted by the NTN node and a measured or estimated downlink carrier frequency of the signal received at the UE at the first time instance.

In another implementation of the second aspect, the second Doppler frequency shift is between a downlink carrier frequency of the signal transmitted by the NTN node and a measured or estimated downlink carrier frequency of the signal received at the UE at the second time instance.

In yet another implementation of the second aspect, the method further includes estimating a first distance between the NTN node and the UE at the first time instance based on at least one of the first Doppler frequency shift and the second Doppler frequency shift.

In yet another implementation of the second aspect, the signal propagation delay between the NTN node and the UE is estimated to be the first distance divided by the speed of light.

In yet another implementation of the second aspect, the method further includes estimating a second distance between the NTN node and the UE at the second time instance based on at least one of the first Doppler frequency shift and the second Doppler frequency shift.

In yet another implementation of the second aspect, the signal propagation delay between the NTN node and the UE is estimated to be the second distance divided by the speed of light.

In yet another implementation of the second aspect, the NTN node is in a low earth orbit (LEO) or a middle earth orbit (MEO).

In yet another implementation of the second aspect, the NTN node is in a geostationary orbit.

In yet another implementation of the second aspect, the UE is configured to communicate with the NTN node using a 5th Generation (5G) New Radio (NR) radio access technology (RAT).

In yet another implementation of the second aspect, applying the signal propagation delay to compensate for the uplink transmission from the UE to the NTN node includes advancing a timing of the uplink transmission to the NTN node by the signal propagation delay.

In yet another implementation of the second aspect, the NTN node is a satellite or a High-Altitude Platform Service (HAPS).

In yet another implementation of the second aspect, the UE is stationary between the first time instance and the second time instance.

In yet another implementation of the second aspect, the UE moves from a first location at the first time instance to a second location at the second time instance.

In yet another implementation of the second aspect, the UE is one without Global Navigation Satellite System (GNSS) capabilities or with GNSS capabilities but suffering from a GNSS outage.

In yet another implementation of the second aspect, the method further includes transmitting the UE's non-GNSS Doppler tracking capability information to a ground-based base station communicatively coupled to the NTN node.

In yet another implementation of the second aspect, the method further includes transmitting an indication of the UE's GNSS outage (GNSSOutageUE) to a ground-based base station communicatively coupled to the NTN node.

According to a third aspect of the present disclosure, a non-terrestrial network (NTN) node comprises one or more non-transitory computer-readable media having computer-executable instructions embodied thereon; and at least one processor coupled to the one or more non-transitory computer-readable media, and configured to execute the computer-executable instructions to: estimate a first Doppler frequency shift in a signal received from a user equipment (UE) at a first time instance; estimate a second Doppler frequency shift in the signal at a second time instance; estimate a signal propagation delay between the UE and the NTN node based on the first Doppler frequency shift and the second Doppler frequency shift; and apply the signal propagation delay to compensate for a downlink transmission from the NTN node to the UE.

In one implementation of the third aspect, the first Doppler frequency shift is between an uplink carrier frequency of the signal transmitted by the UE and a measured or estimated uplink carrier frequency of the signal received at the NTN node at the first time instance.

In another implementation of the third aspect, the second Doppler frequency shift is between an uplink carrier frequency of the signal transmitted by the UE and a measured or estimated uplink carrier frequency of the signal received at the NTN node at the second time instance.

In yet another implementation of the third aspect, the at least one processor is further configured to execute the computer-executable instructions to estimate a first distance between the UE and the NTN node at the first time instance based on at least one of the first Doppler frequency shift and the second Doppler frequency shift.

In yet another implementation of the third aspect, the signal propagation delay between the UE and the NTN node is estimated to be the first distance divided by the speed of light.

In yet another implementation of the third aspect, the at least one processor is further configured to execute the computer-executable instructions to estimate a second distance between the UE and the NTN node at the second time instance based on at least one of the first Doppler frequency shift and the second Doppler frequency shift.

In yet another implementation of the third aspect, the signal propagation delay between the UE and the NTN node is estimated to be the second distance divided by the speed of light.

In yet another implementation of the third aspect, the NTN node is in a low earth orbit (LEO) or a middle earth orbit (MEO).

In yet another implementation of the third aspect, the NTN node is in a geostationary orbit.

In yet another implementation of the third aspect, the NTN node is configured to communicate with the UE using a 5th Generation (5G) New Radio (NR) radio access technology (RAT).

In yet another implementation of the third aspect, applying the signal propagation delay to compensate for the downlink transmission from the NTN node to the UE includes advancing a timing of the downlink transmission to the UE by the signal propagation delay.

In yet another implementation of the third aspect, the NTN node is a satellite or a High-Altitude Platform Service (HAPS).

In yet another implementation of the third aspect, the UE is stationary between the first time instance and the second time instance.

In yet another implementation of the third aspect, the UE moves from a first location at the first time instance to a second location at the second time instance.

In yet another implementation of the third aspect, the UE is one without Global Navigation Satellite System (GNSS) capabilities or with GNSS capabilities but suffering from a GNSS outage.

In yet another implementation of the third aspect, the at least one processor is further configured to execute the computer-executable instructions to relay the UE's non-GNSS Doppler tracking capability information from the UE to a ground-based base station communicatively coupled to the NTN node.

In yet another implementation of the third aspect, the at least one processor is further configured to execute the computer-executable instructions to relay an indication of the UE's GNSS outage (GNSSOutageUE) to a ground-based base station communicatively coupled to the NTN node.

According to a fourth aspect of the present disclosure, a method by a non-terrestrial network (NTN) node for estimating a signal propagation delay between the NTN node and a user equipment (UE), the method comprises: estimating a first Doppler frequency shift in a signal received from the UE at a first time instance; estimating a second Doppler frequency shift in the signal at a second time instance; estimating the signal propagation delay between the UE and the NTN node based on the first Doppler frequency shift and the second Doppler frequency shift; and applying the signal propagation delay to compensate for a downlink transmission from the NTN node to the UE.

In one implementation of the fourth aspect, the first Doppler frequency shift is between an uplink carrier frequency of the signal transmitted by the UE and a measured or estimated uplink carrier frequency of the signal received at the NTN node at the first time instance.

In another implementation of the fourth aspect, the second Doppler frequency shift is between an uplink carrier frequency of the signal transmitted by the UE and a measured or estimated uplink carrier frequency of the signal received at the NTN node at the second time instance.

In yet another implementation of the fourth aspect, the method further includes estimating a first distance between the UE and the NTN node at the first time instance based on at least one of the first Doppler frequency shift and the second Doppler frequency shift.

In yet another implementation of the fourth aspect, the signal propagation delay between the UE and the NTN node is estimated to be the first distance divided by the speed of light.

In yet another implementation of the fourth aspect, the method further includes estimating a second distance between the UE and the NTN node at the second time instance based on at least one of the first Doppler frequency shift and the second Doppler frequency shift.

In yet another implementation of the fourth aspect, the signal propagation delay between the UE and the NTN node is estimated to be the second distance divided by the speed of light.

In yet another implementation of the fourth aspect, the NTN node is in a low earth orbit (LEO) or a middle earth orbit (MEO).

In yet another implementation of the fourth aspect, the NTN node is in a geostationary orbit.

In yet another implementation of the fourth aspect, the NTN node is configured to communicate with the UE using a 5th Generation (5G) New Radio (NR) radio access technology (RAT).

In yet another implementation of the fourth aspect, applying the signal propagation delay to compensate for the downlink transmission from the NTN node to the UE includes advancing a timing of the downlink transmission to the UE by the signal propagation delay.

In yet another implementation of the fourth aspect, the NTN node is a satellite or a High-Altitude Platform Service (HAPS).

In yet another implementation of the fourth aspect, the UE is stationary between the first time instance and the second time instance.

In yet another implementation of the fourth aspect, the UE moves from a first location at the first time instance to a second location at the second time instance.

In yet another implementation of the fourth aspect, the UE is one without Global Navigation Satellite System (GNSS) capabilities or with GNSS capabilities but suffering from a GNSS outage.

In yet another implementation of the fourth aspect, the method further includes relaying the UE's non-GNSS Doppler tracking capability information from the UE to a ground-based base station communicatively coupled to the NTN node.

In yet another implementation of the fourth aspect, the method further includes relaying an indication of the UE's GNSS outage (GNSSOutageUE) to a ground-based base station communicatively coupled to the NTN node.

According to a fifth aspect of the present disclosure, a user equipment (UE) comprises: one or more non-transitory computer-readable media having computer-executable instructions embodied thereon; and at least one processor coupled to the one or more non-transitory computer-readable media, and configured to execute the computer-executable instructions to: estimate a first Doppler frequency shift in a first signal received from a first non-terrestrial network (NTN) node at a first time instance; estimate a second Doppler frequency shift in a second signal from a second NTN node at a second time instance; estimate a third Doppler frequency shift in a third signal from a third NTN node at a third time instance; estimate a first distance between the UE and the first NTN node based on at least one of the first, second and third Doppler frequency shifts; estimate a second distance between the UE and the second NTN node based on at least one of the first, second and third Doppler frequency shifts; estimate a third distance between the UE and the third NTN node based on at least one of the first, second and third Doppler frequency shifts; and estimate a location of the UE by triangulation using the first, second and third distances and locations of the first, second and third NTN nodes.

In one implementation of the fifth aspect, at least two of the first, second, and third NTN nodes are a same NTN node.

In another implementation of the fifth aspect, at least two of the first, second and third signals are a same signal.

In yet another implementation of the fifth aspect, at least two of the first, second and third time instances are a same time instance.

In yet another implementation of the fifth aspect, the first Doppler frequency shift is between a downlink carrier frequency of the first signal transmitted by the first NTN node and a measured or estimated downlink carrier frequency of the first signal received at the UE at the first time instance.

In yet another implementation of the fifth aspect, the second Doppler frequency shift is between a downlink carrier frequency of the second signal transmitted by the second NTN node and a measured or estimated downlink carrier frequency of the second signal received at the UE at the second time instance.

In yet another implementation of the fifth aspect, the third Doppler frequency shift is between a downlink carrier frequency of the third signal transmitted by the third NTN node and a measured or estimated downlink carrier frequency of the third signal received at the UE at the third time instance.

In yet another implementation of the fifth aspect, the NTN node is in a low earth orbit (LEO) or a middle earth orbit (MEO).

In yet another implementation of the fifth aspect, the NTN node is in a geostationary orbit.

In yet another implementation of the fifth aspect, the UE is configured to communicate with the NTN node using a 5th Generation (5G) New Radio (NR) radio access technology (RAT).

In yet another implementation of the fifth aspect, the NTN node is a satellite or a High-Altitude Platform Service (HAPS).

In yet another implementation of the fifth aspect, the UE is a stationary UE.

In yet another implementation of the fifth aspect, the UE is one without Global Navigation Satellite System (GNSS) capabilities or with GNSS capabilities but suffering from a GNSS outage.

In yet another implementation of the fifth aspect, the at least one processor is further configured to execute the computer-executable instructions to transmit the UE's non-GNSS Doppler tracking capability information to a ground-based base station communicatively coupled to the NTN node.

In yet another implementation of the fifth aspect, the at least one processor is further configured to execute the computer-executable instructions to transmit an indication of the UE's GNSS outage (GNSSOutageUE) to a ground-based base station communicatively coupled to the NTN node.

According to a sixth aspect of the present disclosure, a method by a user equipment (UE) for estimating a location of the UE, the method comprises: estimating a first Doppler frequency shift in a first signal received from a first non-terrestrial network (NTN) node at a first time instance;

estimating a second Doppler frequency shift in a second signal from a second NTN node at a second time instance; estimating a third Doppler frequency shift in a third signal from a third NTN node at a third time instance; estimating a first distance between the UE and the first NTN node based on at least one of the first, second and third Doppler frequency shifts; estimating a second distance between the UE and the second NTN node based on at least one of the first, second and third Doppler frequency shifts; and estimating a third distance between the UE and the third NTN node based on at least one of the first, second and third Doppler frequency shifts; estimating the location of the UE by triangulation using the first, second and third distances and locations of the first, second and third NTN nodes.

In one implementation of the sixth aspect, at least two of the first, second, and third NTN nodes are a same NTN node.

In another implementation of the sixth aspect, at least two of the first, second and third signals are a same signal.

In yet another implementation of the sixth aspect, at least two of the first, second and third time instances are a same time instance.

In yet another implementation of the sixth aspect, the first Doppler frequency shift is between a downlink carrier frequency of the first signal transmitted by the first NTN node and a measured or estimated downlink carrier frequency of the first signal received at the UE at the first time instance.

In yet another implementation of the sixth aspect, the second Doppler frequency shift is between a downlink carrier frequency of the second signal transmitted by the second NTN node and a measured or estimated downlink carrier frequency of the second signal received at the UE at the second time instance.

In yet another implementation of the sixth aspect, the third Doppler frequency shift is between a downlink carrier frequency of the third signal transmitted by the third NTN node and a measured or estimated downlink carrier frequency of the third signal received at the UE at the third time instance.

In yet another implementation of the sixth aspect, the NTN node is in a low earth orbit (LEO) or a middle earth orbit (MEO).

In yet another implementation of the sixth aspect, the NTN node is in a geostationary orbit.

In yet another implementation of the sixth aspect, the UE is configured to communicate with the NTN node using a 5th Generation (5G) New Radio (NR) radio access technology (RAT).

In yet another implementation of the sixth aspect, the NTN node is a satellite or a High-Altitude Platform Service (HAPS).

In yet another implementation of the sixth aspect, the UE is a stationary UE.

In yet another implementation of the sixth aspect, the UE is one without Global Navigation Satellite System (GNSS) capabilities or with GNSS capabilities but suffering from a GNSS outage.

In yet another implementation of the sixth aspect, the method further includes transmitting the UE's non-GNSS Doppler tracking capability information to a ground-based base station communicatively coupled to the NTN node.

In yet another implementation of the sixth aspect, the method further includes transmitting an indication of the UE's GNSS outage (GNSSOutageUE) to a ground-based base station communicatively coupled to the NTN node.

The 3GPP is a collaboration agreement that aims to define globally applicable technical specifications and technical reports for third and fourth generation wireless communication systems. The 3GPP may define specifications for next generation mobile networks, systems and devices.

3GPP LTE is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access network system (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15) including New Radio (NR) which is also known as 5G. However, the scope of the present disclosure should not be limited in this regard. At least some aspects of the systems and methods disclosed herein may be utilized in other types of wireless communication systems.

A wireless communication device may be an electronic device used to communicate voice and/or data to a base station (BS), which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc.

In the 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In the 3GPP specifications, a BS is typically referred to as a Node B, an evolved Node B (eNB), a home enhanced or evolved Node B (HeNB), a next Generation Node B (gNB) or some other similar terminology. As the scope of the disclosure should not be limited to 3GPP standards, the terms "base station," "Node B," "eNB," "HeNB," and "gNB" may be used interchangeably herein to mean the more general term "base station." Furthermore, the term "base station" or "BS" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware (i.e., in which the UE has information that may enable transmission and reception) and in which the UE may be allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s).

"Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The 5G communications systems, dubbed NR technologies by the 3GPP, envision the use of time/frequency/space resources to allow for services, such as eMBB transmission, URLLC transmission, and massive Machine Type Communication (mMTC) transmission. Also, in NR, single-beam and/or multi-beam operations is considered for downlink and/or uplink transmissions.

Various examples of the systems and methods disclosed herein are now described with reference to the figures, where like reference numbers may indicate functionally similar elements. The systems and methods as generally described and illustrated in the Figures herein could be arranged and designed in a wide variety of different implementations. Therefore, the detailed description of the present disclosure as illustrated in the figures is not intended to limit scope of the present disclosure but is merely representative of the systems and methods.

Referring now to FIG. 1, FIG. 1 illustrates an NTN 100 having at least one UE and an NTN node, in accordance with an implementation of the present disclosure. In the NTN 100, communication may occur between a UE 102 and a NTN node 104 (e.g., a satellite or HAPS). Although FIG. 1 shows only one UE and one NTN node in the NTN 100, it should be understood that the NTN 100 may include multiple UEs and NTN nodes.

In one implementation, the UE 102 may be equipped with GNSS capabilities. In another implementation, the UE 102 may not be equipped with GNSS capabilities.

In one implementation, the NTN node 104 may be in a geostationary orbit and treated as being substantially stationary relative to the UE 102 on earth. In another implementation, the NTN node 104 may be in a non-geostationary orbit (e.g., a low earth orbit (LEO) or a middle earth orbit (MEO)). As a result, the relative position and velocity between the NTN node 104 and the UE 102 are significantly larger than in the case of the NTN node 104 being in a geostationary orbit.

In one implementation, the NTN 100 may include, but is not limited to, an orthogonal frequency division multiplex (OFDM) network, a time-division multiple access (TDMA) network, and an orthogonal frequency-division multiple access (OFDMA) network.

Figure 2:
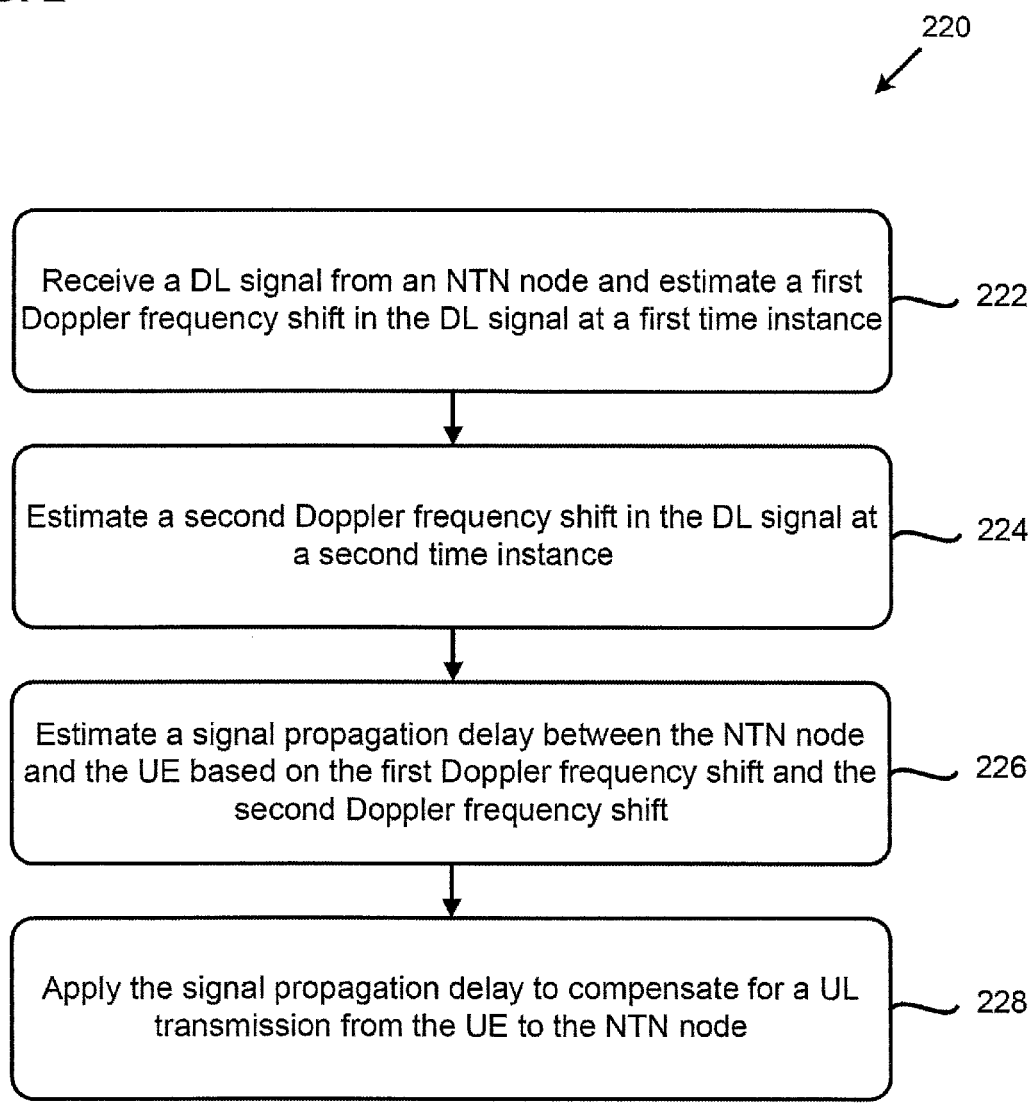
FIG. 2 illustrates a flowchart of a method performed by a UE for estimating a signal propagation delay between an NTN node and the UE, in accordance with an implementation of the present disclosure.

FIG. 2 illustrates a flowchart 200 of a method performed by a UE for estimating a signal propagation delay between an NTN node and the UE, in accordance with an implementation of the present disclosure. As illustrated in FIG. 2, the flowchart 220 includes actions 222, 224, 226, and 228.

In action 222, the UE may receive a downlink (DL) signal from the NTN node and estimate a first Doppler frequency shift in the DL signal at a first time instance. The first Doppler frequency shift is between a DL carrier frequency of the signal transmitted by the NTN node and a measured or estimated DL carrier frequency of the signal received at the UE at the first time instance. To receive the DL signal, the UE needs to track the carrier frequency as received, including any Doppler effect (e.g., Doppler frequency shift). The UE may at a later time instance modulate an uplink (UL) transmission to the correct frequency, with adjustment for a different Doppler offset, so that it is received correctly at the NTN node (e.g., a serving satellite/HAPS). In other words, in receiving the DL signal, the UE already tracks the carrier frequency as received from the NTN node, including Doppler frequency shift. As a result, the Doppler frequency shift in the DL signal can be readily estimated (i.e., known numerically known). According to the present implementation, the Doppler frequency shift can be indicative of the geometry (e.g., distance) between the NTN node and the UE.

Similar to action 222, the UE in action 224 may estimate a second Doppler frequency shift in the DL signal at a second time instance. The second Doppler frequency shift is between a DL carrier frequency of the signal transmitted by the NTN node and a measured or estimated DL carrier frequency of the signal received at the UE at the second time instance.

In action 226, the UE may estimate a signal propagation delay between the NTN node and the UE based on the first Doppler frequency shift and the second Doppler frequency shift. Since the Doppler frequency shifts can be indicative of the geometry between the NTN node and the UE, the corresponding signal propagation delay can be accurately estimated. The method for estimating the signal propagation delay will be discussed with reference to FIG. 3.

In action 228, the UE may apply the signal propagation delay to compensate for a UL transmission from the UE to the NTN node. For example, signals often have an allowable timeslot for reception. Propagation delay may cause the signal transmitted from the UE to be received at the NTN node past the allowed timeslot, degrading system performance significantly. Applying the signal propagation delay to compensate for the UL transmission from the UE to the NTN node may include advancing a timing of the UL transmission to the NTN node by the signal propagation delay. This can enable the signal to be received within the allowed timeslot at the NTN node, resulting in improved system performance.

The method described with reference to the flowchart 220 allows a UE without GNSS capabilities (or a UE with GNSS capabilities but suffering from temporary GNSS service outage) to estimate the signal propagation delay between the NTN node and the UE based on DL signal Doppler frequency shifts that the UE already tracks as part of a carrier frequency offset estimation.

Figure 3:
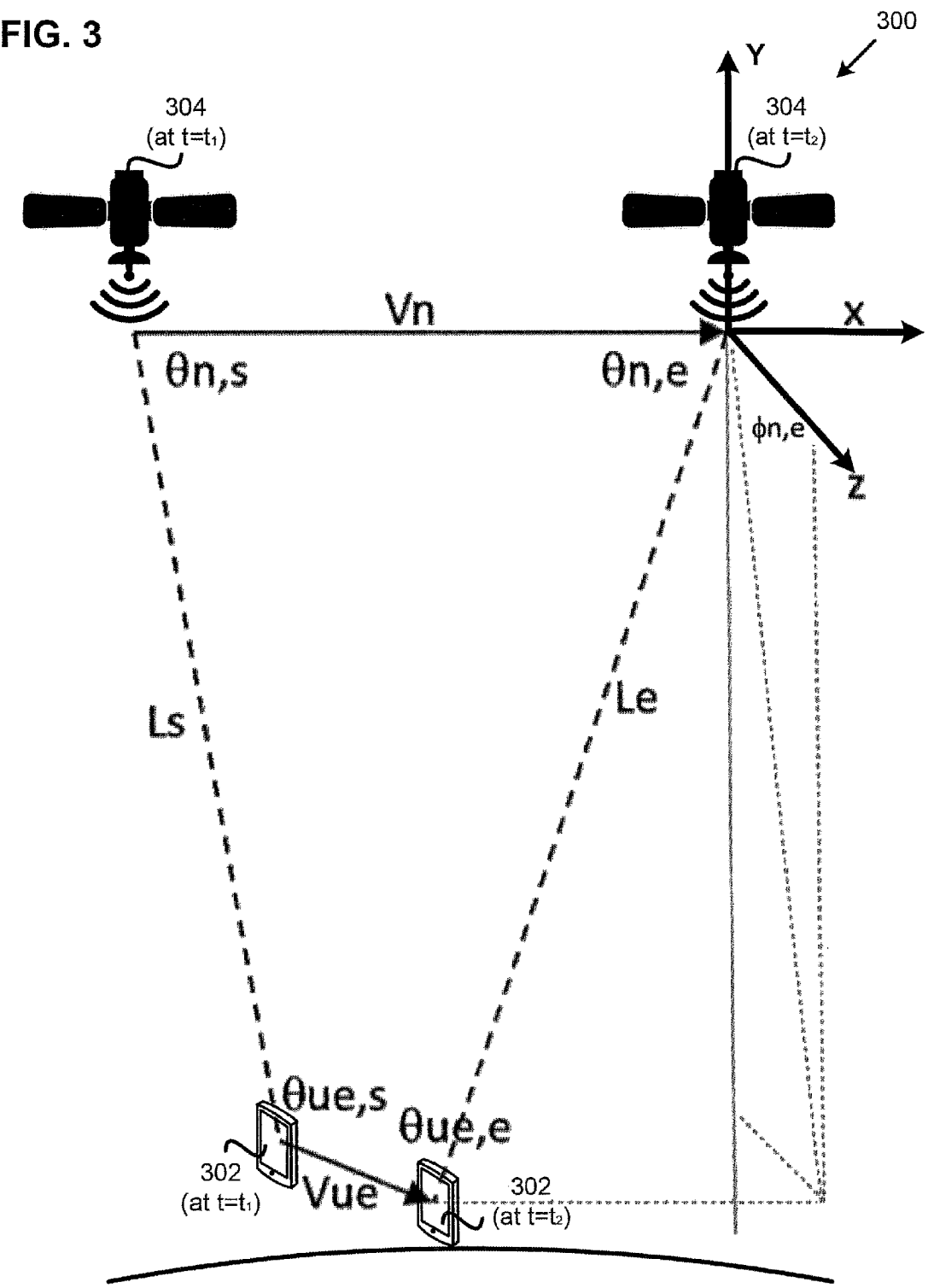
FIG. 3 is an example geometric illustration of a UE and an NTN node, in accordance with in accordance with an implementation of the present disclosure.

Referring to FIG. 3, FIG. 3 is an example geometric illustration 300 of a UE 302 and an NTN node 304, in accordance with an implementation of the present disclosure. In one implementation, the UE 302 and the NTN node 304 may correspond to the UE 102 and the NTN 104, respectively, in FIG. 1.

In the present implementation, $\overline{V_n}$=the velocity of the NTN serving node 304 as it moves from the initial location at t=t1 to the ending location at t=t2, and $V_n = |\vec{V_n}|$. The coordinate system is defined such that $\vec{V_n}$ has only an x component, and is in the x-y plane. Also, in the present implementation, $\vec{V_{ue}}$ =the velocity of the UE 302 as it moves from the initial location at t=t1 to the ending location at t=t2, $V_{ue} = |\vec{V_{ue}}|$, and the initial point of $\vec{V_{ue}}$ is in the x-y plane.

$L_s$=the distance between the serving NTN node 304 and the UE 302 at the starting time (t=t1).

$L_e$=the distance between the serving NTN node 304 and the UE 302 at the ending time (t=t2).

θ,ø indicate the various angles, in particular $\phi_{n,e}$ is the angle between the projection of $L_e$ in the x-z plane and the z-axis.

In FIG. 3, it is assumed that the NTN node 304's travel can be approximated as constant velocity. From FIG. 3, the following relationships are derived:

$V_n \cos \theta_{n,s} + V_{ue} \cos \theta_{ue,s} = cD_{ue,s}/f_{c,n}$   Equation (1), $-V_n \cos \theta_{n,e} - V_{ue} \cos \theta_{ue,e} = cD_{ue,e}/f_{c,n}$   Equation (2), $L_s \cos \theta_{n,s} + L_e \cos \theta_{n,e} = (V_n - V_{ue,x}) \Delta t$   Equation (3), and $-L_s \sin \theta_{n,s} + L_e \sin \theta_{n,e} \sin \phi_{n,e} = -V_{ue,y} \Delta t$   Equation (4), where:
- $D_{ue,s}$ is the Doppler frequency shift estimated by the UE 302 at the starting time (t=t1), $D_{ue,e}$ is the Doppler frequency shift estimated by the UE 302 at the ending time (t=t2), c=3×10⁸ m/s,
- $f_{c,n}$ is the carrier frequency at the transmitter of the serving NTN node 304,
- $V_{ue,x}$ is the x component of $\vec{V_{ue}}$,
- $V_{ue,y}$ is the y component of $\vec{V_{ue}}$, and
- $\Delta t$ is the elapsed time between the starting time (t=t1) and ending time (t=t2).

In matrix algebra, if $$\begin{bmatrix} a & c \\ b & d \end{bmatrix} \begin{bmatrix} L_s \\ L_e \end{bmatrix} = \begin{bmatrix} A \\ B \end{bmatrix},$$   Equation (5)

then $L_s = (Ad - cB)/(ad - cb)$,   Equation (6)

and $L_e = (aB - bA)/(ad - cb)$.   Equation (7)

By combining Equation (3) and Equation (4) with Equation (6) and Equation (7), the following are obtained:

$L_s = [(V_n - V_{ue,x}) \Delta t \sin \theta_{n,e} \sin \phi_{n,e} + V_{ue,y} \Delta t \cos \theta_{n,e}] / [\cos \theta_{n,s} \sin \theta_{n,e} \sin \phi_{n,e} + \cos \theta_{n,e} \sin \theta_{n,s}]$   Equation (8), and $L_e = [-V_{ue,y} \Delta t \cos \theta_{n,s} + (V_n V_{ue,x}) \Delta t \sin \theta_{n,s}] / [\cos \theta_{n,s} \sin \theta_{n,e} \sin \phi_{n,e} + \cos \theta_{n,e} \sin \theta_{n,s}]$   Equation (9).

In the present implementation, $D_{ue,s}$ can be calculated at the UE 302, and $f_{c,n}$ and $V_n$ are known parameters.

In some implementations, the UE 302 may be stationary (e.g., at a fixed location). Thus, $V_{ue}=0$ (and $V_{ue,x}$, $V_{ue,y}=0$ and $\sin \phi_{n,e}=1$). As such, $\cos \theta_{n,s}$ and $\cos \theta_{n,e}$ from Equations (1) and (2) can be readily determined or calculated. Then, $L_s$ and $L_e$ from Equations (8) and (9) can be determined or calculated. The signal propagation delay from the NTN node 304 to the UE 302 is simply the distance divided by c (i.e., 3×10⁸ m/sec). For example, the signal propagation delay from the NTN node 304's location corresponding to $L_s$ is $L_s/c$.

In some implementations, the UE 302 may not be stationary (e.g., not at a fixed location). As a result, $\vec{V_{ue}}$ may be unknown, but $V_{ue}$ is bounded. For example, the UE 302 is mobile, but lacks GNSS/GPS capability which is a typical means of determining UE velocity. In these scenarios, the signal propagation delay can be solved or estimated at a reduced accuracy, but still with reasonable certainty.

For example, with the NTN node 304 far overhead, with an uncertain $\theta_{ue,s}$ and $\theta_{ue,e}$, Equations (1) and (2) can be rearranged into the following inequalities:

$cD_{ue,s}/(f_{c,n} V_n) - V_{ue}/V_n \leq \cos \theta_{n,s} \leq cD_{ue,s}/(f_{c,n} V_n) + V_{ue}/V_n$   Equation (10), and $cD_{ue,e}/(f_{c,n} V_n) - V_{ue}/V_n \leq -\cos \theta_{n,e} \leq cD_{ue,e}/(f_{c,n} V_n) + V_{ue}/V_n$   Equation (11), which give an allowable range for $\cos \theta_{n,s}$, $\theta_{n,s}$, $\cos \theta_{n,e}$, and $\theta_{n,e}$.

In addition, $-V_{ue} \leq V_{ue,x} \leq V_{ue}$   Equation (12), $-V_{ue} \leq V_{ue,y} \leq V_{ue}$   (13), and $\sin \phi_{n,e} \leq V_{ue} \Delta t / L_{min}$   Equation (14), where $L_{min}$ is the minimum possible distance between the NTN node 304 and the UE 302. Using Equations (10) through (14), one can sample the range of input parameters for Equations (8) and (9), producing a corresponding range of values for $L_s$ and $L_e$, and therefore a range of values for the signal propagation delay from the NTN node 304 to the UE 302 corresponding to $L_s$ and $L_e$. With further analysis and details of the application, it is expected that more computationally efficient calculations for the delay, given a mobile UE, can be found.

In addition, once $L_e$ and $L_s$, are obtained, and if a future NTN node 304's location is known relative to the two NTN node locations of this analysis, a future distance between the NTN node 304 and the UE 302 can be computed using the geometry, thus a future signal propagation delay (i.e., a predictive delay) can thus be obtained.

It should be noted that, although FIG. 3 the Equations (1) through (14) given are described based on an assigned Cartesian reference (xyz) frame, implementations of the present disclosure is not limited to the Cartesian reference frame. For example, an alternative reference frame can readily be used, such as a polar, cylindrical, or a rotated and/or translated Cartesian reference frame.

It should noted that, although the implementations above describe estimating signal propagation delay on the UE side, it is also feasible to perform all of these measurements and computations at the NTN node side or elsewhere in the NTN network.

Figure 4:
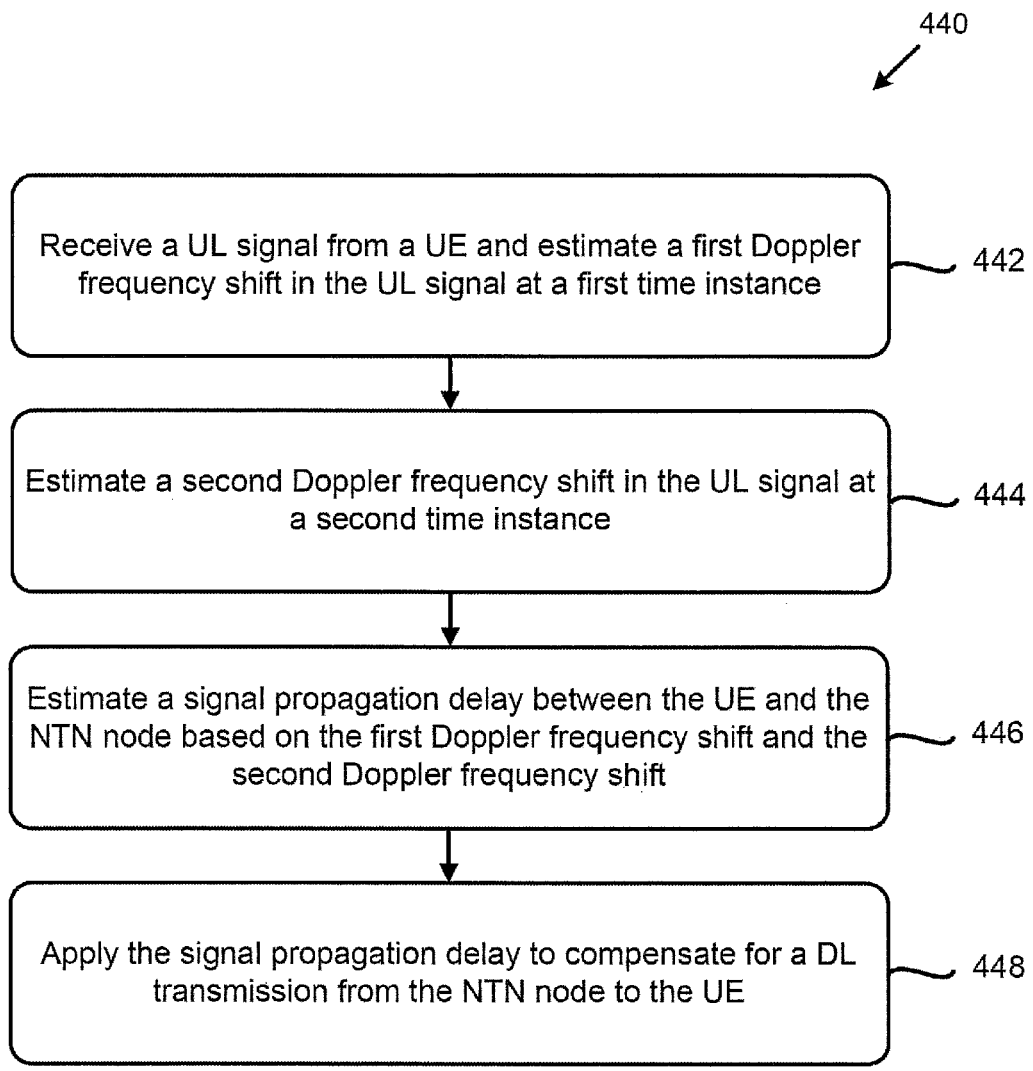
FIG. 4 illustrates a flowchart of a method performed by an NTN node for estimating a signal propagation delay between the NTN node and a UE, in accordance with an implementation of the present disclosure.

Referring to FIG. 4, FIG. 4 illustrates a flowchart 440 of a method performed by an NTN node for estimating a signal propagation delay between the NTN node and a UE, in accordance with an implementation of the present disclosure. As illustrated in FIG. 4, the flowchart 440 includes actions 442, 444, 446, and 448.

In action 442, the NTN node may receive an uplink (UL) signal from UE and estimate a first Doppler frequency shift in the UL signal at a first time instance. The first Doppler frequency shift is between a UL carrier frequency of the signal transmitted by the UE and a measured or estimated UL carrier frequency of the signal received at the NTN node at the first time instance. To receive the UL signal, the NTN needs to track the carrier frequency as received, including any Doppler effect (e.g., Doppler frequency shift). The NTN may at a later time instance modulate a DL transmission to the correct frequency, with adjustment for a different Doppler offset, so that it is received correctly at the UE. In other words, in receiving the UL signal, the NTN already tracks the carrier frequency as received from the UE, including Doppler frequency shift. As a result, the Doppler frequency shift in the UL signal can be readily estimated (i.e., known numerically known). According to the present implementation, the Doppler frequency shift can be indicative of the geometry (e.g., distance) between the UE and the NTN node.

Similar to action 442, the NTN node in action 444 may estimate a second Doppler frequency shift in the UL signal at a second time instance. The second Doppler frequency shift is between a UL carrier frequency of the signal transmitted by the UE and a measured or estimated UL carrier frequency of the signal received at the NTN node at the second time instance.

In action 446, the UE may estimate a signal propagation delay between the UE and the NTN node based on the first Doppler frequency shift and the second Doppler frequency shift. Since the Doppler frequency shifts can be indicative of the geometry between the NTN node and the UE, the signal propagation delay can be accurately estimated. The method for estimating the signal propagation delay is similar to the one discussed above with reference to FIG. 3, except that the Doppler shifts $D_{ue,s}$, and $D_{ue,e}$ need to be replaced with the Doppler shifts measured at the NTN node from a signal originating at the UE, and the carrier frequency $f_{c,n}$ needs to be replaced with the carrier frequency at the transmitter of the UE. All of the calculations (Equations (1) through (14)) stated above can then be computed using these revised Doppler shifts and carrier frequency.

In action 448, the NTN may apply the signal propagation delay to compensate for a DL transmission from the NTN node to the UE. For example, applying the signal propagation delay to compensate for the DL transmission from the NTN node to the UE may include advancing a timing of the DL transmission to the UE by the signal propagation delay.

In an implementation of the present disclosure, for a stationary UE (e.g., a UE at a fixed location), its location can be computed based on the Doppler-based methodology described above. Referring to FIG. 5, FIG. 5 illustrates a flowchart 550 of a method performed by a UE for estimating the UE's location based on Doppler frequency shift, in accordance with an implementation of the present disclosure. As illustrated in FIG. 5, the flowchart 550 includes actions 552, 554, 556, 558, 560, 562, and 564. In one implementation, the UE and one or more NTN nodes may correspond to the UE 102 and the NTN 104, respectively, in FIG. 1.

In action 552, the UE may estimate a first Doppler frequency shift in a first signal received from a first non-terrestrial network (NTN) node at a first time instance. The first Doppler frequency shift is between a downlink carrier frequency of the first signal transmitted by the first NTN node and a measured or estimated downlink carrier frequency of the first signal received at the UE at the first time instance.

In action 554, the UE may estimate a second Doppler frequency shift in a second signal from a second NTN node at a second time instance. The second Doppler frequency shift is between a downlink carrier frequency of the second signal transmitted by the second NTN node and a measured or estimated downlink carrier frequency of the second signal received at the UE at the second time instance In action 556, the UE may estimate a third Doppler frequency shift in a third signal from a third NTN node at a third time instance. The third Doppler frequency shift is between a downlink carrier frequency of the third signal transmitted by the third NTN node and a measured or estimated downlink carrier frequency of the third signal received at the UE at the third time instance.

In action 558, the UE may estimate a first distance between the UE and the first NTN node based on at least one of the first, second and third Doppler frequency shifts. In action 560, the UE may estimate a second distance between the UE and the second NTN node based on at least one of the first, second and third Doppler frequency shifts. In action 562, the UE may estimate a third distance between the UE and the third NTN node based on at least one of the first, second and third Doppler frequency shifts.

In action 564, the UE may estimate a location of the UE by triangulation using the first, second and third distances and locations of the first, second and third NTN nodes. To determine the UE's location, the distance between the UE and each of three known NTN node locations (does not have to be the same NTN node), not in a straight line, can be computed using the method shown and described with reference to FIG. 3 above (e.g., by using Equations (1) through (9)). The UE location can be then computed using triangulation from the three known NTN node locations. It should be noted that, in the method described with reference to FIG. 5, at least two of the first, second, and third NTN nodes may be the same NTN node, at least two of the first, second and third signals may be the same signal, and at least two of the first, second and third time instances may be the same time instance.

5G systems may use a GNSS based methodology for determining delay when GNSS capability is available in the UE. Such methodology would have different characteristics than the Doppler-based methodology discussed above. An NTN capable UE may indicate this GNSS capability on connection or handover to an NTN-linked gNB. For example, the following flag can be added to the "UE capability information elements" as described in clause 6.3.3 of 38.331:

GNSSCapability enumerated {True, False} to indicate the UE's GNSS capability.

In addition, the capability to track or estimate Doppler with a system such as described above may also be signaled by the NTN capable UE. For example, the following flag can be added to the "UE capability information elements" as described in clause 6.3.3 of 38.331:

DopplerTrackingCapability enumerated {True, False} to indicate the UE's Doppler tracking capability.

In the course of communication with an NTN-linked gNB, a GNSS-equipped UE may not be able to continue using GNSS, for example, because of poor link conditions to GNSS serving satellite(s). In such an event, the accuracy of position location, and therefore delay estimation based on GNSS, may be degraded. Or, the UE may switch delay estimation to another methodology such as the Doppler-based methodology previously discussed. Here, it may be useful for an NTN-based gNB to be apprised of the GNSS outage so that either communication in CONNECTED mode can continue under these conditions, or that the NTN-based gNB may handoff the UE to another radio access network (e.g., a terrestrial-based radio access network).

Alternatively, the NTN-nodes may comprise a set of one or more airborne and/or satellite relay links to a ground based gNB as per the recent 3GPP study on enhancements of 5G NR for Non-Terrestrial Networks (3GPP TR 38.822), albeit potentially with detailed changes to the tracking algorithms described and mentioned previously. The entire content of 3GPP TR 38.822 is incorporated by reference into the present disclosure. For example in relaying GNSS Outage status, the following flag can be added to the "RRC information elements" as described in clause 6.3.2 of 38.331:

GNSSOutageUE enumerated {True, False}
to indicate the UE's GNSS outage. This indication may be signaled based on a configuration by the gNB.

In some implementations of the present disclosure, instead of calculating the Doppler (e.g., Doppler frequency shift), one could use the input voltage to a voltage-controlled oscillator used in the UE receiver. This combined with the previously defined fc,n can indicate the Doppler frequency shift.

In some implementations of the present disclosure, filtering the Doppler frequency shift and/or the other input values to the various equations above may mitigate erroneous measurements due to various undesired effects such as noise and jitter. Kalman, minimum mean-square estimation, and polynomial curve fitting are examples of such filtering.

In some implementations of the present disclosure, a UE may use Doppler frequency shift to determine the distance between the UE and the serving NTN node, and therefore the propagation delay between the NTN node and the UE.

In some implementations of the present disclosure, a UE may extend the Doppler-based methodology to predict future propagation distance/delay if sufficient future NTN node ephemeris information is available.

In some implementations of the present disclosure, the Doppler-based methodology to determine the UE location.

In some implementations of the present disclosure, various signalings may be used to indicate a UE's GNSS capability, UE's Doppler tracking capability, and UE's GNSS outage.

From the present disclosure, it is evident that various techniques can be utilized for implementing the concepts of the present disclosure without departing from the scope of those concepts. Moreover, while the concepts have been described with specific reference to certain implementations, a person of ordinary skill in the art would recognize that changes can be made in form and detail without departing from the scope of those concepts. As such, the disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A user equipment (UE), comprising:
   one or more non-transitory computer-readable media having storing computer-executable instructions embodied thereon; and
   at least one processor coupled to the one or more non-transitory computer-readable media, and configured to execute the computer-executable instructions to:
   estimate a first Doppler frequency shift in a signal received from a non-terrestrial network (NTN) node at a first-time instance;
   estimate a second Doppler frequency shift in the signal at a second time instance;
   estimate a signal propagation delay between the NTN node and the UE based on the first Doppler frequency shift and the second Doppler frequency shift; and
   apply the signal propagation delay to compensate for an uplink transmission from the UE to the NTN node; and
   transmit an indication of a Global Navigation Satellite System (GNSS) outage of the UE (GNSSOutageUE) to a ground-based base station communicatively coupled to the NTN node.

2. The UE of claim 1, wherein the first Doppler frequency shift is between a downlink carrier frequency of the signal transmitted by the NTN node and a measured, or estimated, downlink carrier frequency of the signal received at the UE at the first time instance.

3. The UE of claim 1, wherein the second Doppler frequency shift is between a downlink carrier frequency of the signal transmitted by the NTN node and a measured, or estimated, downlink carrier frequency of the signal received at the UE at the second time instance.

4. The UE of claim 1, wherein the at least one processor is further configured to execute the computer-executable instructions to:
   estimate a first distance between the NTN node and the UE at the first time instance based on at least one of the first Doppler frequency shift and the second Doppler frequency shift.

5. The UE of claim 1, wherein the at least one processor is further configured to execute the computer-executable instructions to:
   estimate a second distance between the NTN node and the UE at the second time instance based on at least one of the first Doppler frequency shift and the second Doppler frequency shift.

6. The UE of claim 1, wherein the UE is without Global Navigation Satellite System (GNSS) capabilities or the UE is with GNSS capabilities, but and said UE is suffering from the GNSS outage.

7. A method performed by a user equipment (UE) for estimating a signal propagation delay between a non-terrestrial network (NTN) node and the UE, the method comprising:
   estimating a first Doppler frequency shift in a signal received from the NTN node at a first-time instance;
   estimating a second Doppler frequency shift in the signal at a second time instance;
   estimating the signal propagation delay between the NTN node and the UE based on the first Doppler frequency shift and the second Doppler frequency shift; and
   applying the signal propagation delay to compensate for an uplink transmission from the UE to the NTN node; and
   transmitting an indication of a Global Navigation Satellite System (GNSS) outage of the UE (GNSSOutageUE) to a ground-based base station communicatively coupled to the NTN node.

8. A non-terrestrial network (NTN) node, comprising:
   one or more non-transitory computer-readable media having storing computer-executable instructions embodied thereon; and
   at least one processor coupled to the one or more non-transitory computer-readable media, and configured to execute the computer-executable instructions to:
   estimate a first Doppler frequency shift in a signal received from a user equipment (UE) at a first-time instance;

estimate a second Doppler frequency shift in the signal at a second time instance;

estimate a signal propagation delay between the UE and the NTN node based on the first Doppler frequency shift and the second Doppler frequency shift; and apply the signal propagation delay to compensate for a downlink transmission from the NTN node to the UE; and relay non-Global Navigation Satellite System (non-GNSS) Doppler tracking capability information of the UE to a ground-based base station communicatively coupled to the NTN node.

9. The NTN node of claim 8, wherein the first Doppler frequency shift is between an uplink carrier frequency of the signal transmitted by the UE and a measured, or estimated, uplink carrier frequency of the signal received at the NTN node at the first time instance.

10. The NTN node of claim 8, wherein the at least one processor is further configured to execute the computer-executable instructions to:

estimate a first distance between the UE and the NTN node at the first time instance based on at least one of the first Doppler frequency shift and the second Doppler frequency shift.

11. The NTN node of claim 8, wherein the at least one processor is further configured to execute the computer-executable instructions to:

estimate a second distance between the UE and the NTN node at the second time instance based on at least one of the first Doppler frequency shift and the second Doppler frequency shift.

12. The NTN node of claim 8, wherein applying the signal propagation delay to compensate for the downlink transmission from the NTN node to the UE includes advancing a timing of the downlink transmission to the UE by the signal propagation delay.

13. The NTN node of claim 8, wherein the UE is without Global Navigation Satellite System (GNSS) capabilities or the UE is with GNSS capabilities, but and said UE is suffering from a GNSS outage.

* * * * *